United States Patent

Wille et al.

[11] Patent Number: 5,889,622
[45] Date of Patent: Mar. 30, 1999

[54] DATA PROCESSING DEVICE INCLUDING A MICROPROCESSOR AND AN ADDITIONAL ARITHMETIC UNIT

[75] Inventors: Thomas Wille, Hamburg; Ralf Malzahn, Seevetal, both of Germany; Jean-Jaques Quisquater, Rhode-Saint-Genèse, Belgium; Ronald Ferreira, Paris, France

[73] Assignee: U.S. Philips Corporation, New York, N.Y.

[21] Appl. No.: 903,566

[22] Filed: Jul. 31, 1997

[30] Foreign Application Priority Data

Jul. 31, 1996 [DE] Germany .......................... 196 30 861.5

[51] Int. Cl.[6] ........................................................ G06F 7/38
[52] U.S. Cl. ................................ 364/736.01; 364/716.02
[58] Field of Search .......................... 364/736.01, 716.01, 364/716.02

[56] References Cited

U.S. PATENT DOCUMENTS

| | | | |
|---|---|---|---|
| 3,617,720 | 11/1971 | Gentleman | 364/726 |
| 4,811,267 | 3/1989 | Ando et al. | 364/736.01 |
| 4,969,121 | 11/1990 | Chan et al. | 364/716.01 |
| 5,530,662 | 6/1996 | Ide | 364/736.01 |
| 5,732,251 | 3/1998 | Bartkowiak | 364/736.01 |

*Primary Examiner*—David H. Malzahn
*Attorney, Agent, or Firm*—Gregory L. Thorne

[57] ABSTRACT

The arithmetic unit in a data processing system with a microprocessor and an additional arithmetic unit carries out special arithmetic operations, preferably integrated in a single semiconductor chip, is controlled by the microprocessor via a number of registers. Several sets of such registers are provided. The registers of one set are selected via a selection circuit. As a result, a set of registers which is not required during execution of a calculation by the arithmetic unit can be filled with new data by the microprocessor and, after completion of the calculation in the arithmetic unit, switching over to a newly filled set of registers takes place so that the arithmetic unit can continue with a new set of operands without having to observe a waiting period.

4 Claims, 1 Drawing Sheet

DATA PROCESSING DEVICE INCLUDING A MICROPROCESSOR AND AN ADDITIONAL ARITHMETIC UNIT

BACKGROUND OF THE INVENTION

The invention relates to a data processing device which includes a microprocessor and an additional arithmetic unit, and also to a portable data carrier provided with such a data processing device.

Data processing devices of this kind, notably integrated in a single semiconductor chip, are known in principle, for example from the data sheet concerning the Philips Integrated Circuit P83C852. This integrated circuit is preferably incorporated in portable, card-like data carriers, for example, having the format of a credit card, and are preferably used to encrypt data according to a non-symmetrical encryption method or to decrypt such data. For this purpose inter alia data blocks must be exponentiated with a key number modulo a constant, the constant comprising a large number of digits so as to achieve as effective encryption as possible. The arithmetic steps required for this purpose can in principle also be performed by the microprocessor; however, this would require too much time, so that an additional, special arithmetic unit is integrated in the chip, together with the microprocessor, said arithmetic unit being optimized in respect of the calculation steps required for encryption. The connection between the microprocessor and the additional arithmetic unit is established via special registers, controlling the data transfer, and via at least one data memory which is accessed by the microprocessor as well as by the additional arithmetic unit.

Such known integrated circuits with a microprocessor and an additional arithmetic unit have the drawback that after completion of a processing step or a processing cycle by the additional arithmetic unit, the microprocessor must load the registers again with new values for at least partly new operands with which the next processing cycle commences. However, this implies a substantial loss of time so that the overall data processing device requires too much time for data encryption or decryption, notably in the case of rather long key numbers.

SUMMARY OF THE INVENTION

It is an object of the invention to provide a data processing device with a microprocessor and an additional arithmetic unit in which, after completion of a processing cycle, the arithmetic unit can immediately commence the next processing cycle for new data with a minimum loss of time.

This object is achieved according to the invention essentially in that the registers for controlling the data transfer and for the transfer of instructions are provided as at least two sets of registers. The outputs of these registers are switched over by the content of a further register, so that only one set of registers is active at any time. The microprocessor, however, can write new data into the inactive registers at all times so that this data is available upon completion of a processing cycle by the arithmetic unit and the next processing cycle may commence immediately. An encryption or decryption operation is thus substantially accelerated.

The encryption of data requires the use of long operands with many positions whereas the memories provided in such integrated circuits are designed for data words of limited length only, i.e. often for data words of eight bits. A processing cycle of the arithmetic unit then requires a plurality of data words which are stored at different addresses in the memory. In order to avoid repeated loading of the registers for the control of the data transfer, in an embodiment of the invention the content of the registers for controlling the data transfer determines not only the addresses or the starting address of the operands to be processed, but also their length. The length can then be indicated, for example, as a number of memory data words. This enables very simple and short indication of the operands to be successively processed.

BRIEF DESCRIPTION OF THE DRAWINGS

Embodiments of the invention will be described in detail hereinafter with reference to the drawing. Therein.

DESCRIPTION OF THE PREFERRED EMBODIMENTS

Figure 1:
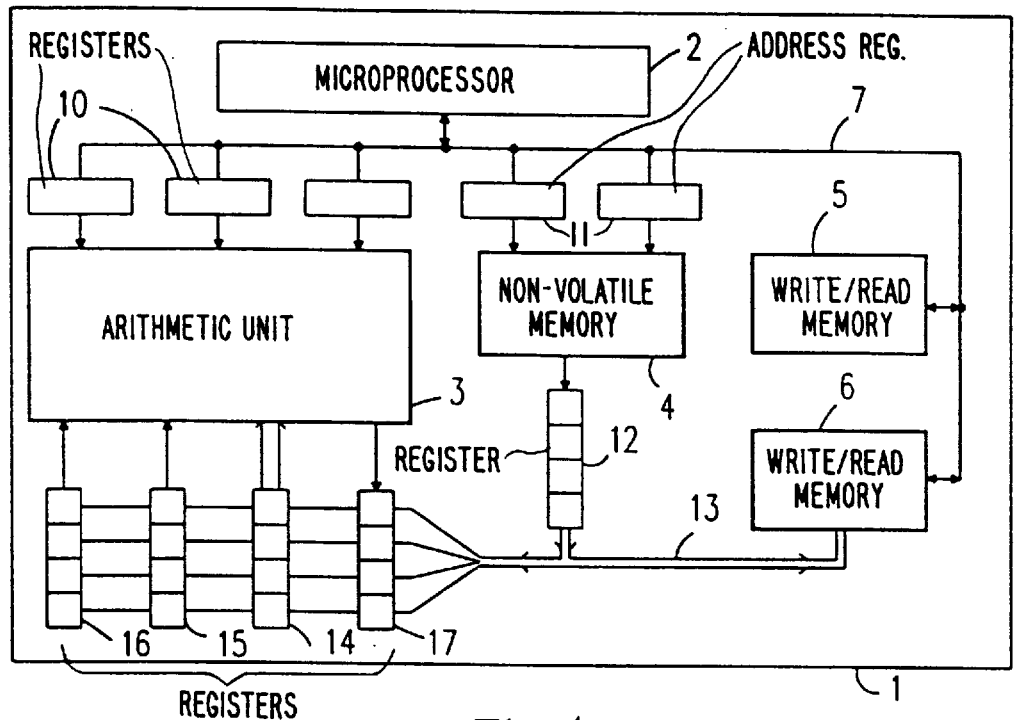
FIG. 1 shows a block diagram of the overall data processing device.

Referring to FIG. 1, the data processing device 1 includes a microprocessor 2 as well as a special arithmetic unit 3 for given calculations whose execution by means of the microprocessor 2 would be too time consuming. Also provided are two write/read memories 5 and 6 as well as a non-volatile memory 4. The microprocessor is coupled essentially directly to the memories 5 and 6 via an internal bus 7 and, via address registers 11, to the non-volatile memory 4 as well as to the arithmetic unit 3 via further registers 10. Control signals for controlling the function of the arithmetic unit 3 as well as for controlling the transfer of operands for the arithmetic unit 3 and the result thereof are transferred essentially via the registers 10. The operands themselves are transferred via registers 14 to 16 and the result is transferred, via the register 17, by means of a further internal bus 13 which receives data representing operands from the non-volatile memory 4 and the memory 6. Moreover, the result of a calculation executed in the arithmetic unit 13 is applied to the memory 6 via the bus 13. Because the memory 6 can be accessed by the arithmetic unit 3 as well as by the microprocessor 2, via this memory data can also be exchanged between these two components.

As has already been stated, the internal bus 13 serves essentially only for the transfer of data. Because the arithmetic unit 3 must also perform operations with long operands, having a length of several bytes, the data bus 13 is designed for a rather large data width, for example for 4 bytes. In this respect it is assumed that the memory 5 can also output 4 bytes in parallel, either because of an appropriate construction or an internal serial-parallel conversion via which a plurality of words having a length of one byte each are successively input and output in parallel. Such an arrangement is represented by the register 12 at the output of the non-volatile memory 4 which thus conducts four successively input bytes in parallel via the bus 13. The registers 14 to 17 are constructed so that they accept four bytes in parallel and output these bytes in parallel or possibly also in smaller portions of less than 4 bytes, depending on the word length that can be handled by the arithmetic unit 3. The register 17 for the calculation results may also be capable of accepting a plurality of bytes in succession or in parallel, in conformity with the construction of the arithmetic unit, so as to output each time 4 bytes in parallel via the internal bus 13.

For the sake of clarity, FIG. 1 does not show the transfer of the addresses for the memories 4 and 5 from the arithmetic device 3, because such addressing of memories is known to a person skilled in the art.

Figure 2:
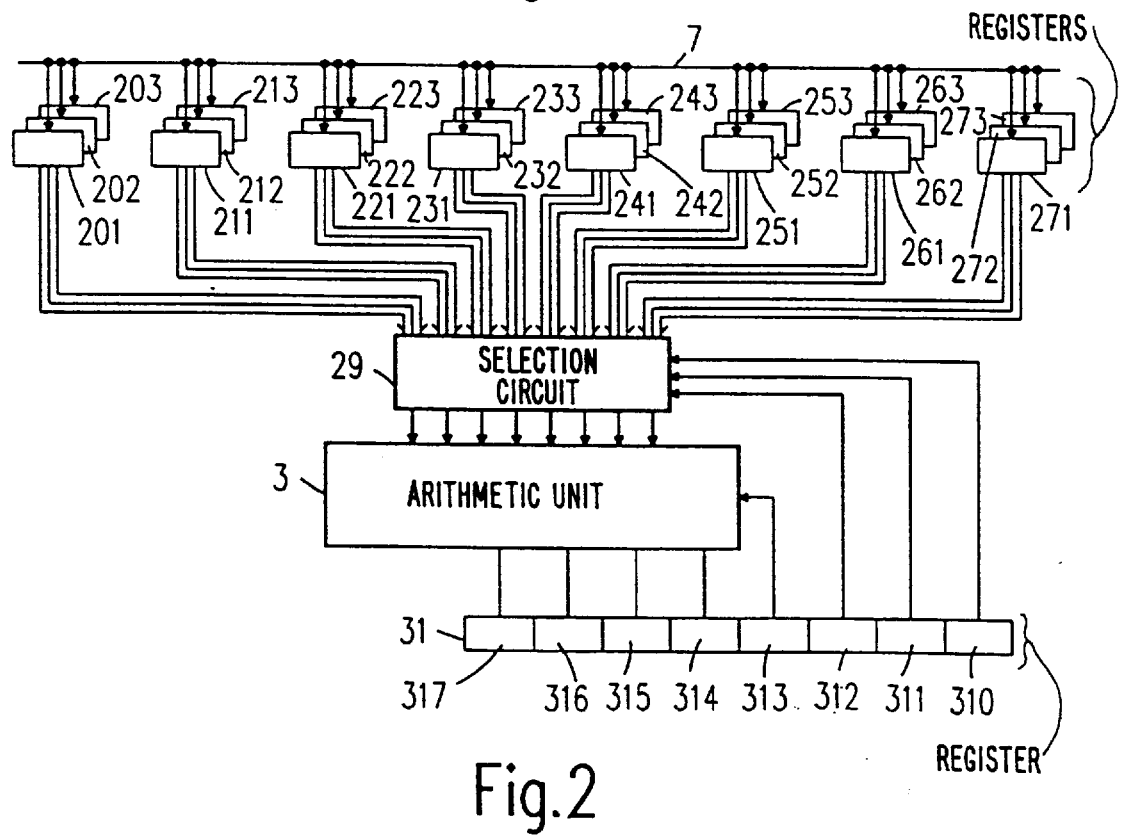
FIG. 2 illustrates the control of the arithmetic unit by three sets of registers.

The control of the arithmetic unit 3 by the registers 10 diagrammatically represented in FIG. 1 is more clearly illustrated by FIG. 2. Overall, three sets of eight registers each are used, i.e. 201 to 271, 202 to 272 and 203 to 273. The outputs of all registers are connected to a selection circuit 29 which selects the outputs of one of these sets of registers for application to the arithmetic unit 3, the selection being controlled by bit positions 310 to 312 of a further register 31. This register 31 is present only once. The inputs of all registers are connected to the internal data bus 7 and can be individually selected for writing by the microprocessor, the selection leads having been omitted for the sake of clarity. Each of the registers 201 to 271, 202 to 272 and 203 to 273 can accept a byte of data only from the internal bus 7 and apply it only to the selection circuit 29, whereas the register 31 can be written and read bit by bit, the bit positions 310 to 313 accepting data only from the internal data bus and controlling, via the outputs, the selection circuit 29 as well as the arithmetic unit 3, whereas the bit positions 314 to 317 are provided for further communication between the arithmetic unit 3 and the microprocessor 2.

The eight registers provided in each set of registers serve the following purposes, only the registers of the first set being described for the sake of simplicity. The register 201 contains the operation code for controlling the arithmetic unit 3 and information indicating whether operands must be derived from the memory 5 or from the memory 6.

The register 211 indicates the starting address for the first operand.

The register 221 contains the starting address for the second operand.

The register 231 contains the address for a further operand which is processed differently in the arithmetic unit 3, depending on the operation to be performed by the arithmetic unit. For example, the operand indicated by this address is the modulus in the case of modulo operations.

The register 241 contains an address for the calculation result of the arithmetic unit 3.

The registers 251 and 261 serve to indicate the length of the first operand and the second operand, respectively.

Finally, the register 271 contains a part of an address for the non-volatile memory 4, it being assumed that this memory has a number of memory locations which is larger than the number that can be addressed by means of one byte.

The described device enables optimum use of the calculation capability of the arithmetic unit 3, because during the execution of a calculation while using one set of registers, for example the registers 201 to 271, the microprocessor can load the registers of a further set, for example the registers 202 to 272, with new values and when the arithmetic unit 3 has completely processed a set of operands and has output the result, the microprocessor can change the content of the bit positions 310 to 312 of the register 31 in one step so that the addresses for new operands become valid immediately and the calculation using these operands can start without having to observe a waiting period. The indication of the operand addresses by starting address and operand length allows for very simple, fast and space-saving addressing of the operands.

What is claimed is:

1. A data processing device comprising:
   a microprocessors; and
   an arithmetic unit for executing special, defined calculations, the arithmetic unit being coupled to the microprocessor via a number of first and second registers, the first registers serving for control of data transfer and the second registers serving for transfer of instructions;
   at least two sets of first and second registers, the registers of the various sets being selectively writable by the microprocessor; and
   a third register which can also be selectively written bit by bit by the microprocessor and whose content indicates selection of one set of the sets of first and second registers for controlling the data transfer and the transfer of instructions.

2. A data processing device as claimed in claim 1, wherein the content of the first registers determines the addresses and the length of at least two operands to be processed in the arithmetic unit.

3. A portable data carrier provided with a data processing device as claimed in claim 2.

4. A portable data carrier provided with a data processing device as claimed in claim 1.

* * * * *